United States Patent [19]

Brown

[11] Patent Number: 4,947,482
[45] Date of Patent: Aug. 7, 1990

[54] STATE ANALOG NEURAL NETWORK AND METHOD OF IMPLEMENTING SAME

[75] Inventor: Paul B. Brown, Morgantown, W. Va.
[73] Assignee: West Virginia University, Morgantown, W. Va.
[21] Appl. No.: 385,984
[22] Filed: Jul. 25, 1989

Related U.S. Application Data

[63] Continuation of Ser. No. 7/064,097, Jun. 18, 1987, abandoned.

[51] Int. Cl.$^5$ .............................................. G06G 7/12
[52] U.S. Cl. .................................. 364/807; 307/201; 364/513
[58] Field of Search ............... 364/148, 513, 600, 602, 364/800, 807; 307/201; 382/14

[56] References Cited

U.S. PATENT DOCUMENTS

| | | | |
|---|---|---|---|
| 3,950,733 | 4/1976 | Cooper et al. | 307/201 |
| 4,573,142 | 2/1986 | Azegami. | |
| 4,593,370 | 6/1986 | Balkanli. | |

OTHER PUBLICATIONS

"Self Organization of Orientation Sensitive Cells in the Striate Cortex", Chr. Von der Malsburg, Kybernetik 14, pp. 85–100, (1973).
"Development of Ocularity Domains and Growth Behaviour of Axon Terminals", C. Von der Malsburg, Biological Cybernetics 32, pp. 42–62 (1979).
"How Patterned Neural Connections Can be Set up by Self-Organization", D. J. Willshaw and C. Von der Malsburg, Proceedings of Royal Society of London Series B., vol. 194, pp. 431–445 (1976).
"Specificity and Plasticity of Retinotectal Connections: A Computational Model", V. A. Whitelaw and J. D. Cowan, The Journal of Neuroscience, vol. 1, No. 12, pp. 1369–1387, Dec. 1981.
"What Bell Laboratories is Learning from Slugs", John Paul Newport, Jr., Fortune, Apr. 1, 1985.
"Neutral Research Yields Computer that Can Learn", Chappell Brown, Electronic Engineering Times, Feb. 3, 1986.
Digital Integrated Electronic, Herbert Taub and Donald Schilling, pp. 420–428, McGraw-Hill, Inc. (1977).
Electronics for the Modern Scientist, Chapter 7: Digital Signal Processing, Paul B. Brown, Gunter N. Franz, Howard Moraff, pp. 410–426, Elsevie Science Publishing Co., Inc. (1982).

Primary Examiner—Jerry Smith
Assistant Examiner—Stephen M. Baker
Attorney, Agent, or Firm—Richard V. Westerhoff

[57] ABSTRACT

A neural network is implemented by discrete-time, continuous voltage state analog device in which neuron, synapse and synaptic strength signals are generated in highly parallel analog circuits in successive states from stored values of the interdependent signals calculated in a previous state. The neuron and synapse signals are refined in a relaxation loop while the synaptic strength signals are held constant. In learning modes, the synaptic strength signals are modified in successive states from stable values of the analog neuron signals. The analog signals are stored for as long as required in master/slaver sample and hold circuits as digitized signals which are periodically refreshed to maintain the stored voltage within a voltage window bracketing the original analog signal.

15 Claims, 6 Drawing Sheets

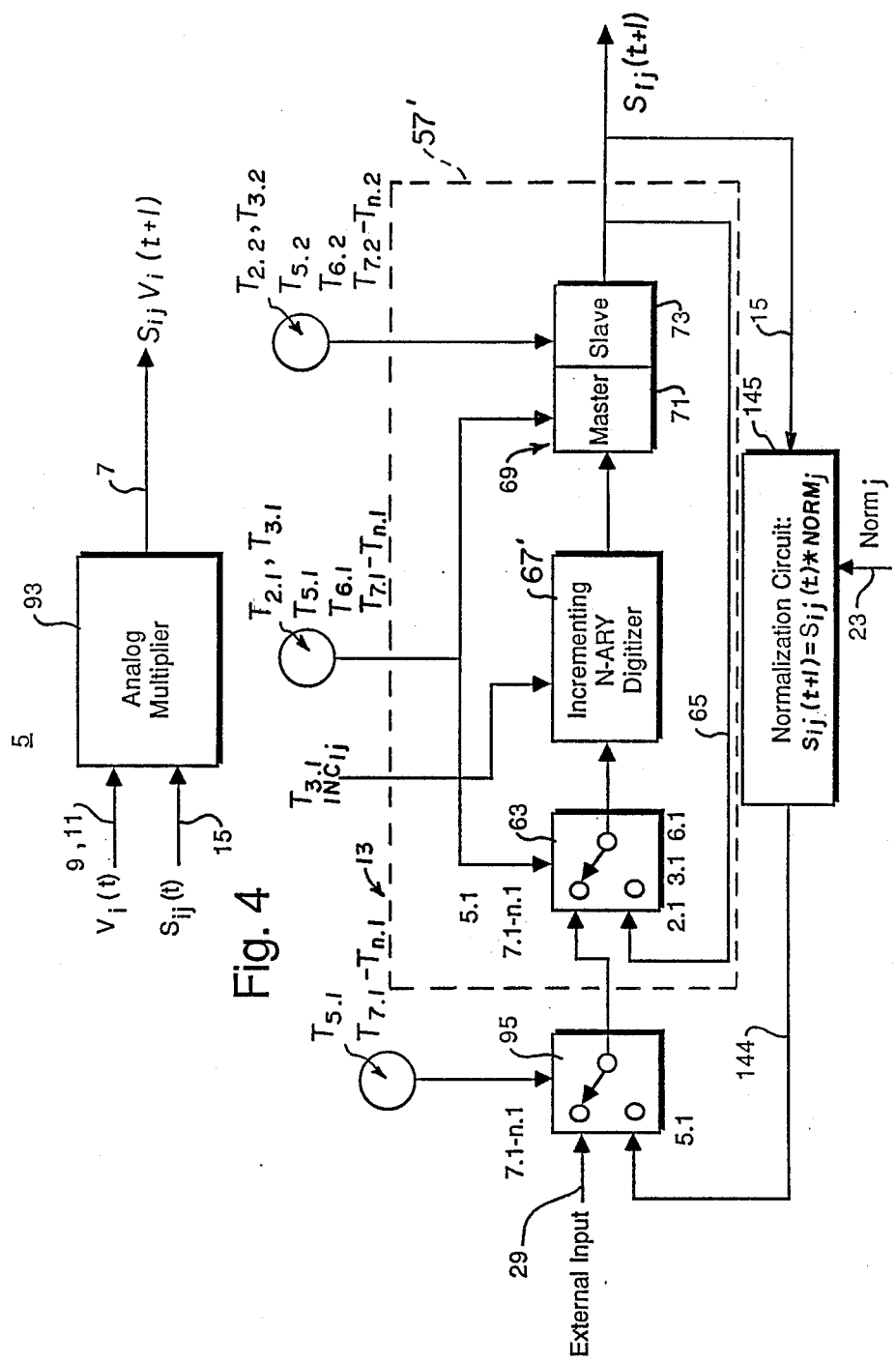

STATE ANALOG NEURAL NETWORK AND METHOD OF IMPLEMENTING SAME

This is a continuation of application Ser. No. 64,097, filed on June 18, 1987, abandoned.

RELATED APPLICATION

My concurrently filed application entitled "Apparatus and Method for Long-Term Storage of Analog Signals", U.S. Pat. No. 4,809,223.

BACKGROUND OF THE INVENTION

1. Field of the Invention

This invention is directed to a method and apparatus for implementing a neural network. More particularly, it is directed to implementing a state-analog neural network in which analog computations are made for each of the network nodes based upon frozen values of the analog signals from the previous computation step.

2. Background Information

Neural networks, or nets, are, for the purposes of this discussion, devices which perform computations or analysis using multiple summing nodes with thresholds (neurons), each of which receives inputs from fixed or variable gain amplifiers (synapses). Each synapse receives input from a neuron or from an external signal source. The most general neural networks are those in which every neuron receives input via a synapse from every other neuron (including itself) and every external input. In such a network, the number of synapses is equal to the square of the number of neurons plus the product of the numbers of neurons and inputs. Neural networks are "programmed" by specifying the gains (strengths) of the synapses. In most applications, a subset of the synapses in the most general network can be omitted because their strengths are insignificant.

In some applications, the strengths of synapses may be modified on the basis of how closely the outputs of neurons approximate the desired outputs, given certain inputs. In other words, modification is based upon the errors at the outputs. If this is done under external control, it is referred to as "training". If it is done using circuitry internal to the neural net, it is referred to as "self-organization". Both are cases of "learning".

Neural nets may be organized in "layers", where each layer consists of circuitry engaged in a coordinated parallel processing of inputs from a previous layer. When more than one layer exists, it may be necessary to use some form of backward propagation of errors from the output layer for synaptic strength modifications in the earlier layers.

Neural networks operate to some extent in a manner similar to portions of the nervous systems of animals. Like such physiological systems they involve multiple parallel processing paths. Memory is distributed rather than concentrated in specific locations as in a digital computer. Such distributed circuits can act as optimal filters and extract information from background noise. As such, they are also useful in making rapid, best guess approximations. They have application in recognizing complex signal patterns such as images which could be used for instance in security systems for identifying faces or finger prints. They can also be used for knowledge representation and manipulation, providing a basis for cognitive functions and intuition in artificial intelligence. They can also provide coordinated output of complex signal patterns for control, e.g., for coordinated movements of limbs in robotic walking.

Implementation of neural networks at this point has mostly been achieved with simulation on general purpose digital computers. Now several groups are working on implementation in hardware. To the best of my knowledge, hardware implementations have been of the following types: (1) digital, i.e., logic which is discrete-voltage, largely discrete-time; and (2) analog, which is continuous-time, continuous-voltage.

Digital systems, such as computers, utilize state logic. State logic is discrete-time, discrete-voltage logic which in its purest form has the following constraint: all signals which are inputs for computation are acquired by computing elements at specific times, determined by a clock. The time of acquisition is a time when all the signals are known to be the final values obtained in the previous compute cycle, and before the initiation of the next compute cycle. This generally means that the outputs of computing elements are captured at clock transitions, and held stable so that the computing elements can perform their next computations on stable values. This is necessary because there often exist feedback or feedforward paths which otherwise would cause inputs to a computing element to change while it is performing its computation. In parallel processing applications such as neural nets, it is quite common for the outputs of computing elements to influence each other and some method of "freezing" the results of one computation step is needed so that the next computation step can be performed on a stable input value. Also, different parallel computing elements can take different times to respond to transients, either because they have different slew rates or because they have to slew different amounts. This can lead to devices which should operate in synchrony becoming out of phase. Finally, if it is necessary for a circuit to perform a sequence of operations, especially if the sequence may vary from one time to another, it is easier to control the sequencing with a clocked system.

For each state of a state logic device there is customarily a unique timing pulse which causes the execution of computations (or storage of results of computations) required in that state. For fool-proof operation, it is often necessary for these pulses (and their states) to be separated in time, so that one state is over before the next begins. Finally, in many state logic devices it is necessary to use master/slave storage, where two timing pulses (or opposite transitions of one pulse) are used to strobe master and slave storage elements. In this way, a computing element can never see its own output as one of the inputs during clocking. Instead, each computing element output provides input to a master storage device, and each computing element input comes from the output of a slave storage device. Another function of the timing pulses in state logic is to control steering logic to route signals.

State logic implementation of a neural network with a meaningful number of nodes through simulation by a general purpose digital computer has not produced real-time solutions due to the large number of parallel paths and the interactions generated by even a moderate number of neurons. Parallel processors, each performing calculations for several neurons, would help, but would require complex interconnections between processors.

Pure digital implementation with dedicated processors for each neuron and synapse, even through large scale integration on a single chip, would require considerable real estate. The large number of interconnections required in any neural network is compounded in such a system where, for instance, eight bit signals would be needed for reasonable accuracy.

Analog circuits occupy less real estate on a chip and require only a single lead for transmitting each analog signal. However, differences in slew times in individual circuits in a massive array of interconnected analog circuits can produce race conditions which, combined with feedback within a network, can effect system stability. In addition, it is customary in analog circuits to store analog signals where required in sample and hold circuits. Such circuits, in which the analog signal is stored as a charge on a capacitor, are not suitable for prolonged storage, as the stored charge decays with time. In neural networks, some analog signals must be stored for very long periods of time. For instance, synaptic strength signals may remain unchanged for indefinite periods of time, such as when the net is not operating in a learning mode or when a particular synaptic strength is not affected in a certain learning situation.

There is a need therefore for a neural network having a meaningful number of nodes which can operate reliably in real-time while occupying a minimum of physical space.

It is therefore a primary object of the invention to provide a method and apparatus for implementing such a neural network.

It is another important object of the invention to provide such a method and apparatus which function in a state analog mode.

SUMMARY OF THE INVENTION

These and other objects are realized by a state analog neural network in which neuron and synapse signals are computed in parallel analog circuits with results stored in state analog memory devices at instants determined by clock pulses. The state analog memory devices "freeze" the analog values so that computations throughout the network of interconnected analog circuits are made on stable values of the required signals. The analog neuron and synapse signals are repetitively computed from the last stored values of applied signals in successive analog states determined by the clock pulses until the computed values of the stored signals converge on substantially stable values between successive analog states.

Stored values of variable analog synaptic strength signals are used in computing selected synapse signals. During an analog state after the state in which the neuron and synapse signals have substantially converged to stable values, the stored values of selected synaptic strength signals are modified in accordance with a learning scheme, and the neuron and synapse signals are recomputed in successive states of another relaxation loop.

The analog signals to be stored are each converted in a tracking n-ary digitizer to an n-ary signal having one of n discrete levels with the one level being the level next greater in magnitude than the analog signal. During analog states determined by clock pulses, series connected master/slave sample and hold circuits store the n-ary signal which is then continuously available at the output of the slave sample and hold circuit. When the value of a stored analog signal has not been changed or modified for an interval approaching in duration the time required for the stored signal to droop to the next lower level, the stored signal is refreshed by converting the signal stored in the slave sample and hold circuit to a refreshed n-ary signal of the one level in the tracking n-ary digitizer, and then on successive selected clock pulses sampling and holding the refreshed n-ary signal in the master/slave sample and hold circuits.

In a preferred embodiment of the invention the analog synaptic strength signals are modified by converting the signal stored in the slave sample hold circuit to an adjusted n-ary level different from the one n-ary level and storing the adjusted n-ary level signal in the series master/slave sample and hold circuit on successive selected clock pulses. This occurs using synaptic strength incrementing rules embodied in the hardware. In the exemplary embodiment of the invention, the n-ary level signal stored as the analog synaptic strength signal is adjusted by incrementing the n-ary level to the level of second greater magnitude than the magnitude of the analog synaptic strength signal and storing in the master/slave sample and hold circuit the incremented n-ary level signal. Since analog synaptic strength signals are only incremented in this embodiment of the invention, normalization of the stored synaptic strength signals is required to prevent their values from continuously escalating.

The synaptic strength signals of a particular synapse are normalized, as a function of the synaptic strengths of all of the synapses whose outputs are applied to the neuron to which the particular synapse output signal is applied. Specifically, all the synaptic strengths of synapses whose output signals are applied to this neuron are summed and divided by a desired sum to generate a normalization factor. The synaptic strength signals for all the synapses connected to that neuron are then multiplied by the normalization factor, converted to an n-ary signals, and stored in the associated master/slave sample and hold circuits.

BRIEF DESCRIPTION OF THE DRAWINGS

A full understanding of the invention can be gained from the following description of the preferred embodiments when read in conjunction with the accompanying drawings in which:

FIG. 4 is a block diagram of a synapse circuit which forms a part of the neural network illustrated in FIG. 1.

FIG. 5 is a block diagram of a synaptic strength circuit which forms a part of the neural network shown in FIG. 1.

DESCRIPTION OF THE PREFERRED EMBODIMENTS

Figure 1:
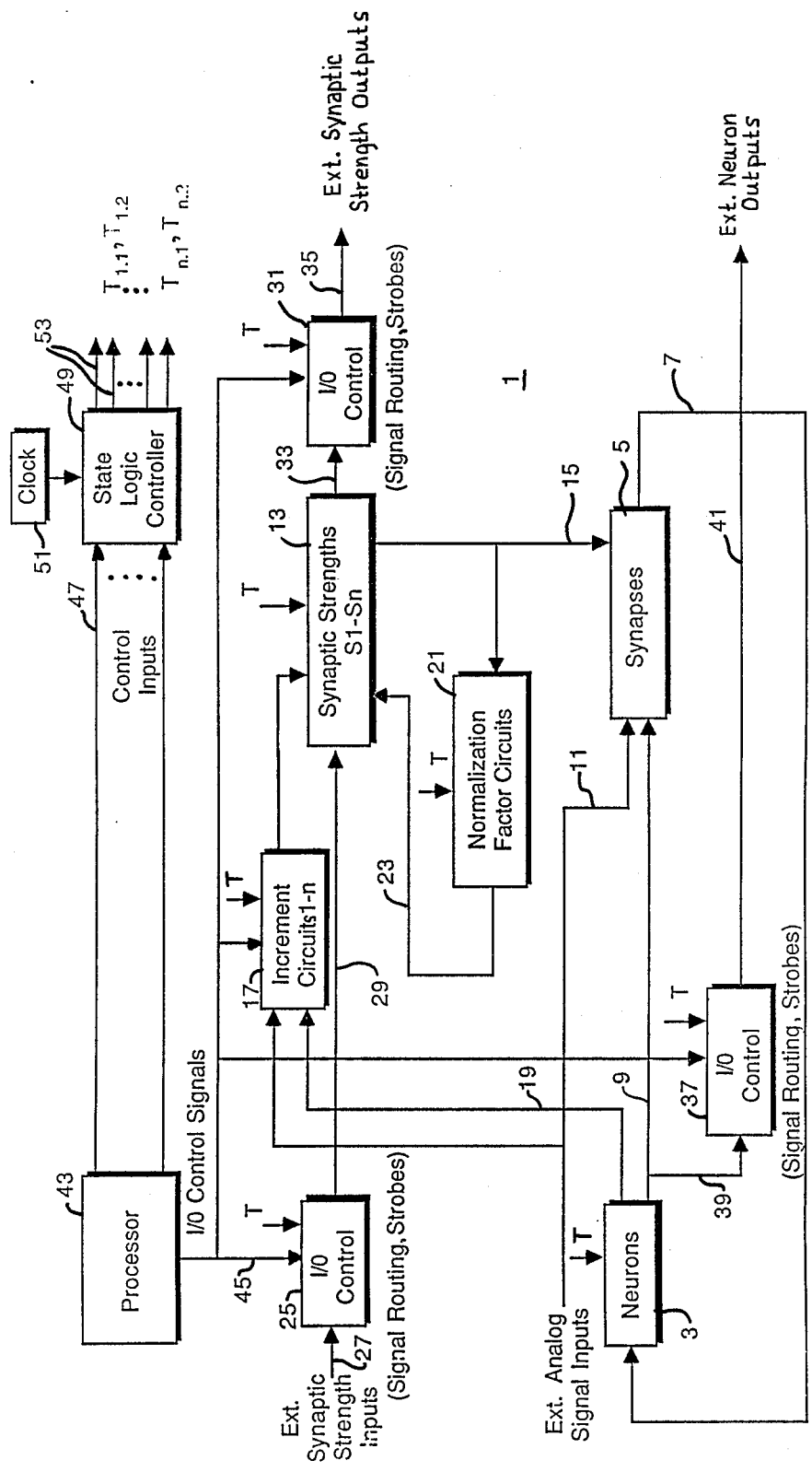
FIG. 1 is a block diagram of an exemplary embodiment of a state analog neural network in accordance with the invention.

An exemplary embodiment of a state analog neural network in accordance with the invention is illustrated in block diagram form in FIG. 1. In such a state analog device, the computing elements are continuous-voltage (analog devices), but a clocking scheme is used to capture results of computations, and the devices are therefore referred to as state machines. In state analog devices, all timing pulses can be thought of as controlling switches, which are used to strobe the storage of voltages on capacitances in sample and hold circuits, and to route signals.

The neural network 1 of FIG. 1 includes a plurality of neurons indicated collectively at 3 and synapses indicated collectively at 5. The output of each synapse is connected by an individual lead to the input of one neuron. These connections are indicated collectively by the lead 7 in FIG. 1. The output of each neuron is connected by an individual lead to the input of one or more of the synapses as indicated collectively by the lead 9. Other synapses receive external analog signals as inputs over separate leads indicated collectively by the lead 11. In the generalized neural network, every neuron receives input via a synapse from every other neuron, including itself, and every external input. In such a network, the number of synapses is equal to the square of the number of neurons plus the product of the numbers of neurons and inputs. In most applications, a subset of the synapses in the most general network can be omitted because their strengths are insignificant.

The number of neurons and their interconnections through synapses varies in accordance with the application. Exemplary networks are discussed for example in "Self Organization of Orientation Sensitive Cells in the Striate Cortex", Chr. Von der Malsburg, Kybernetik 14, pp 85-100, (1973); "How Patterned Neural Connections Can be Set Up by Self-Organization", D. J. Willshaw an C. Von der Malsburg, Proceedings of Royal Society of London, Series B. Vol. 194, pp 431-445 (1976); and "Development of Ocularity Domains and Growth Behavior of Axon Terminals", C. von der Malsburg, Biological Cybernetics 32, pp 42-62 (1979).

Whatever the arrangement of particular interconnections between neurons, and the number of neurons, for a specific application, FIG. 1 illustrates the organization of such a network as a state analog device. The external analog signals which are applied to some of the synapses, and constitute the inputs to the networks, can be analog signals generated by transducers such as for instance the pixels in a video camera. Preferably, all of the components illustrated in the network of FIG. 1 are included on a single integrated circuit chip, except perhaps for the processor 43 and the state logic controller 49 which may be external to the chip. In a large network in which the neurons are grouped in hierarchical layers, a circuit such as shown in FIG. 1 could be used for one or more layers. Where more than one such chip is required to accommodate all of the neurons, the external analog signals applied to some of the synapses as indicated at 11 could be signals from other neurons on additional chips.

For each of the synapses 5 having a variable rather than a fixed, synaptic strength, a separate synaptic strength circuit, shown collectively at 13 in FIG. 1, is provided. As will become evident later, the variable synaptic strengths are what give the neural network the ability to learn. Each synaptic strength circuit 13 is connected to its associated synapse circuit 5 by a separate lead indicated collectively at 15.

Modification of the variable synaptic strengths to effect learning can be carried out in different ways. In the exemplary net, variable synaptic strengths selected in a manner to be explained, are modified by incrementing the stored value of the analog synaptic strength signal under the control of an increment circuit associated with each variable synaptic strength and identified collectively as 17. Each increment circuit 17 is responsive to the outputs received over leads 19 from the neuron circuit to which the synapse circuit controlled by the associated synaptic strength circuit is applied and the neuron, or external input, from which that synapse circuit receives an input. The increment circuits 17 also respond to certain control signals to be explained later. Since in the exemplary network, synaptic strengths are only modified by incrementing, these signals must be normalized to preclude the strength from increasing endlessly. Normalization is controlled by normalization factor circuits, collectively 21, with one normalization factor circuit provided for each neuron. The normalization factors produced by these circuits are fed back to the associated synaptic strength circuits 13 over individual leads 23.

An input/output control 25 switches external synaptic strength inputs to the synaptic strength circuits 13. Control 25 is a multiplexer which routes synaptic strength signals supplied serially on a single input lead 27 to one of the separate leads 29 connected to a variable synaptic strength circuit 13. The external synaptic strength signals are applied to the synaptic strength circuits during a mode of learning known as training which will be explained later.

Another input/output control 31 selectively provides serial output of selected synaptic strength signals received on individual leads 33 on a serial output lead 35. These synaptic strength output signals are used during the training mode and can also be used to clone the network. For instance, if the network has learned a certain task, the variable synaptic strengths can be extracted and applied to another identical network so that it will perform the learned task with similar proficiency.

A third input/output control 37 provides serial output the analog values of selected neuron circuits 3 received on individual leads 39 on the single neuron output lead 41. Such neuron outputs, for instance, represent the solution to the task assigned to the network, or where several chips constitute a network, the output for the portion of the overall task assigned to the particular chip, such as the subtask performed by a layer in a hierarchically organized network.

The input/output control circuits 25, 31 and 37 are in turn controlled by a processor 43, such as an on or off chip microprocessor, through input/output control signals supplied over multichannel control bus 45. These input/output control signals include address selection, read, and write signals which control the input/output functions of the input/output controls 25, 31 and 37, and signals which control the increment circuits 17.

The processor 43 controls the overall functioning of the neural network 1. This includes generating control inputs on leads 47 to a state logic controller 49 which gates selected timing pulses, $T_n$, generated by a clock 51, onto a series of timing leads 53. The timing signals generated on each of the leads 53 are two phase signals.

Thus, the first phase of the signal generated on the first lead is identified as $T_{1,1}$ and the second phase of that signal is identified as $T_{1,2}$. In the exemplary system, the two phases of the timing signal are represented by the leading edge and trailing edge respectively of a clock pulse. Selected ones of the timing signals $T_1$ to $T_n$ are applied to the previously described circuits of FIG. 1 to control the state analog operation of the network. The individual timing signals applied to each type of circuit will be discussed in connection with a description of those circuits. It should be understood that the two phases of each timing pulse result in non-overlapping pulses on separate leads generated internally by the chip logic.

Figure 2:
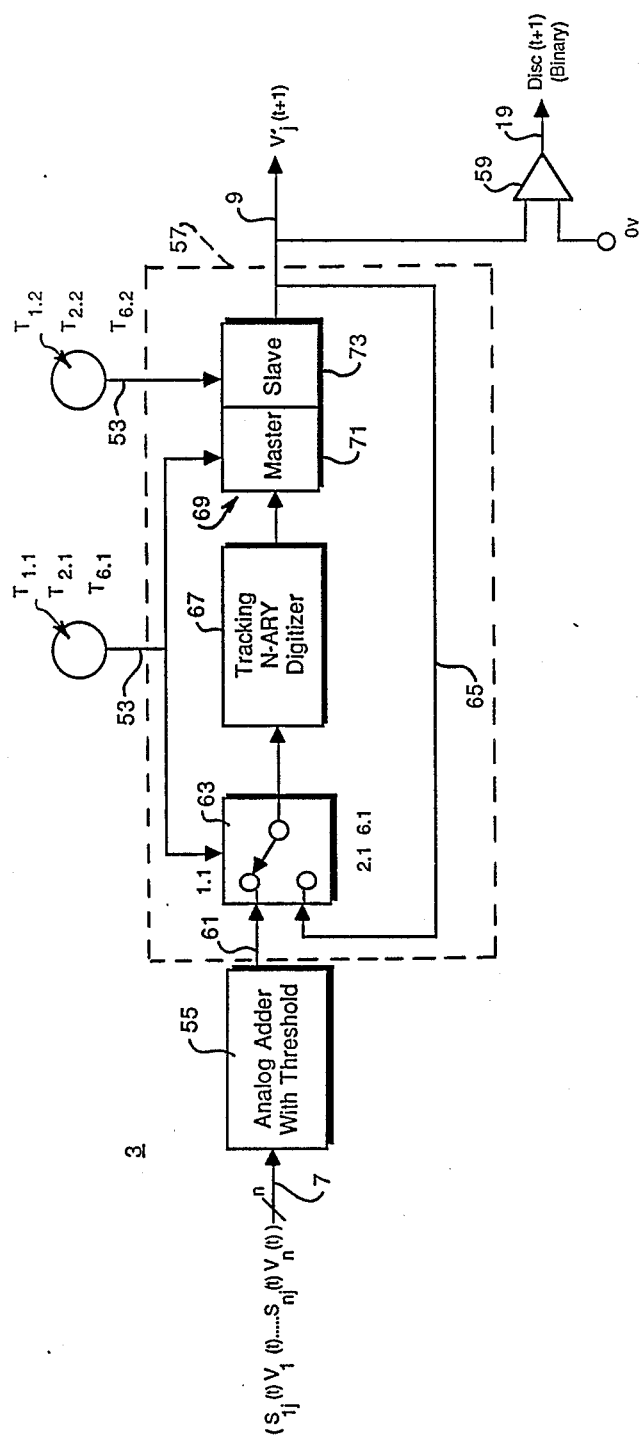
FIG. 2 is a block diagram of an analog neuron circuit which forms a part of the neural network illustrated in FIG. 1.

FIG. 2 illustrates an exemplary embodiment of a neuron circuit 3. Each neuron circuit includes an analog adder with a threshold 55, an n-ary memory 57, and a discriminator 59 on the output. The analog adder with threshold 55 sums the output signals $S_{ij}(t)V_i(t)$ where i=1 to n, on the leads 7 from the n synapses which supply inputs to that particular neuron, j. The analog adder with threshold device 55 generates an analog output on lead 61 having a value equal to the amount by which the sum of the applied synapse signals exceeds a predetermined threshold. The lead 61 applies this output signal to a selector switch 63 in the n-ary memory 57. The selector switch 63 selects between the output of the analog adder with threshold 55, and a feedback signal on a lead 65. The selected signal is applied to an n-ary digitizer 67 which converts the applied analog signal to an n-ary signal having one of n discrete levels. The one level is the level next greater in magnitude than the magnitude of the applied signal. The n-ary signal is stored in an analog storage device 69 which, in the exemplary embodiment, comprises series connected master and slave sample and hold circuits 71 and 73 respectively.

The master sample and hold circuit 71 samples the n-ary signal at instants determined by the first phase of a timing signal, and stores it on a capacitor in a well known manner. The slave sample and hold circuit 73 then copies and stores on its internal capacitor the signal stored in the master sample and hold circuit on the second phase of the timing signal. By using master and slave sample and hold circuits and a two phase timing signal, a memory never sees its own output as an input. The digitized analog signal stored in the slave sample and hold circuit 73 is continuously available on the output lead 9 as the neuron output signal $V_j(t+1)$. As is characteristic of this state analog system, the current value of the neuron signal at time $t + 1$ is computed from the applied synapse signals computed using stored values calculated in the previous state at time t, so that computations are always being made on stable input values.

The current value of the neuron signal which is stored in the slave/sample and hold circuit 73 is also applied to a discriminator 59 which generates an output signal DISC (t+1) on one of the leads 19. This is a binary signal which is TRUE if the neuron is generating an output and is FALSE otherwise.

Since the analog signals are stored as a charge on capacitors in the master/slave sample and hold circuits 71 and 73, the stored signals will droop with time as the charge leaks from the capacitors. If a new value of the neuron signal has not been stored in the storage element 69 for a prolonged period of time, which approaches the time required for the signal to decay to the next lower n-ary level, a timing signal is applied to the switch 63 to apply the signal stored in the slave/sample and hold circuit 73 to the tracking n-ary digitizer 67. The digitizer 67 boosts the applied signal back up to the n-ary level which is next greater in magnitude than the applied signal. This reestablished n-ary signal is then stored in the master/slave sample and hold circuits. Thus, the stored value of the analog neuron signal is periodically refreshed to maintain the value of the signal within a window defined by the n-ary levels which bracket the value of the neuron signal at the instant it was originally stored.

The timing pulses to which the various components of the n-ary memory 57 of the neuron circuit are responsive are indicated in FIG. 2. Thus the selector switch is responsive to the timing pulse $T_{1,1}$, or the first phase of the first timing pulse, to receive the output of the analog adder with threshold 55 for storage in the memory 57, and in response to the first phase of the timing pulses 2 and 6 to connect the output of the slave sample and hold circuit 73 to the digitizer 67 to refresh the stored value of the neuron signal. The master sample and hold circuit 71 responds to the first phase of the same timing signals 1, 2 and 6 to store the n-ary signal generated by the digitizer 67, while the slave sample and hold circuit 73 copies and holds, on the second phase of the same timing signals, the new signal entered in the master sample and hold circuit.

Figure 3:
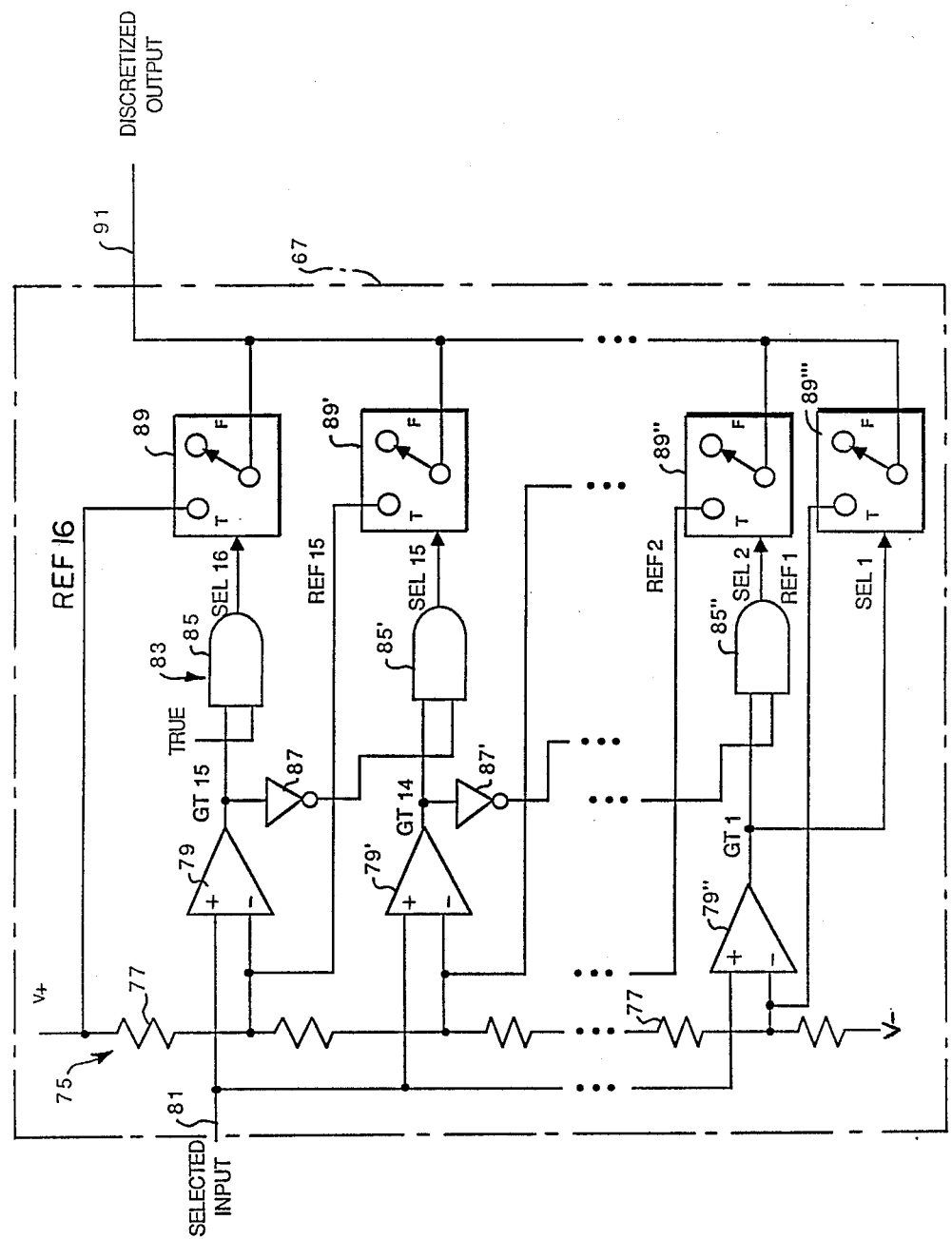
FIG. 3 is a schematic diagram of an n-ary digitizer which forms a part of the memory in the neuron circuit of FIG. 2.

FIG. 3 illustrates an exemplary embodiment of the tracking n-ary digitizer 67 in the memory 57. The digitizer 67 includes a resistive voltage divider 75 comprising a series of resistors 77 fed by stable voltage sources, V + and V −. This voltage divider generates reference voltages for the n discrete levels of the n-ary signal generated by the digitizer 67. In the example, sixteen reference voltages REF 1 to REF 16 are generated. For accuracy comparable to that of an eight bit binary signal, 256 reference voltages would be provided.

A series of threshold devices (discriminators) 79 compare the selected input on a lead 81 to each of the reference voltages generated by the voltage divider 75. Logic circuitry 83 selects the discriminator 79 associated with the reference voltage of greatest magnitude which is exceeded in magnitude by the analog voltage on the lead 81. This logic circuitry 83 includes an AND gate 85 associated with each discriminator to which is applied the output of the associated discriminator 79 and the output of the discriminator 79 associated with the reference voltage of next greatest magnitude inverted by an inverter 87.

The AND gates 85 each control a switch 89. The switches 89 are normally open, but when closed they connect the reference voltage of next greater magnitude to the output lead 91. The logic circuitry 83 is such that only the switch 89 associated with the reference voltage of greatest magnitude which is exceeded by the applied voltage will be turned on, and that switch will apply the reference voltage of next greatest magnitude to the lead 91.

Operation of the digitizer 67 of FIG. 3 may be more clearly understood by the following example. Assume that the analog voltage on the lead 81 is higher (more positive) than the reference voltage applied to the discriminator 79', but below the reference voltage applied to the discriminator 79. Thus, the output, GT14, of discriminator 79' will be high while the output, GT15, of discriminator 79 will be low. However, the low output of discriminator 79 will be inverted by the inverter 87 so that both of the inputs to the AND 85' will be high and the output, SEL15, will be high to turn on switch 89'. With the switch 89' turned on, the reference voltage, REF 15, applied to the discriminator 79 will be connected to the lead 91. All of the other switches 89 will be turned off: switch 89 because the output of discriminator 79 is low; and all of the other switches below switch 89' because, while the output of the associated discriminator will be high, the output of the next higher discriminator is also high and will be inverted to apply a low input to the associated AND gate 85. It can be seen then, that the analog signal on lead 81 is boosted to the next higher of the n-ary levels generated by the n-ary digitizer 67.

A more complete description of the n-ary memory, is provided in the related patent application referred to above.

FIG. 4 illustrates an exemplary embodiment of a synapse circuit 5. The synapse circuit includes an analog multiplier 93 which continuously multiplies an input signal $V_i(t)$, such as a neuron signal on a lead 9 or an external signal such as a transducer input or a neuron on another board received on a lead 11, by the associated synaptic strength signal $S_{ij}(t)$.

An exemplary embodiment of a synaptic strength circuit 13 is illustrated in FIG. 5. The basic component of the synaptic strength circuit is a modified form 57' of an n-ary memory. The modification in the memory 57' is the incrementing n-ary digitizer 67'. The digitizer 67', in addition to converting an applied signal to an n-ary signal having a level next greater in magnitude than the level of the applied signal, can also selectively increment the n-ary signal in response to an $INC_{ij}$ incrementing signal from the associated incrementing circuit 17. In response to an $INC_{ij}$ signal, the incrementing n-ary digitizer 67' converts the applied signal to an n-ary signal having a level which is second greater in magnitude than magnitude of the applied signal for storage in the master/slave sample and hold circuits 71 and 73.

The synaptic strength circuit 13 includes, in addition to the modified n-ary memory 57', an additional selector switch 95. The switch 95 selects between the normalized synaptic strength signal generated by a normalizing circuit 145 on a lead 144, and an external synaptic strength signal applied on the lead 29. Switch 95 is controlled by timing signals supplied by the state logic controller 49 with the normalized synaptic strength signal being selected on the first phase of timing signal 5 and the external signal being selected on an appropriate input signal 7 to n.

The switch 63 within the n-ary memory 57' applies the signal from switch 95 to the incrementing n-ary digitizer 67' in response to the timing pulse 5 and a selected one of the pulses 7 to n. The signal stored in the slave sample and hold circuit 73 is applied by the switch 63 to the incrementing n-ary digitizer 67' in response to the first phase of the refresh timing signals 2 and 6, and also when a synaptic strength signal is to be incremented in response to the first phase of timing pulse 3. The master and slave sample and hold circuits 71 and 73 store the signals generated by the incrementing n-ary digitizer 67' in response to the first and second phases respectively of timing pulses 2, 3, 5, 6, and the appropriate input pulse 7 to n.

When an external synaptic strength signal is to be stored in the n-ary memory 57', the switches 95 and 63 are operated during the first phase of the appropriate input timing pulse 7 to n to apply the external signal on lead 29 to the incrementing n-ary digitizer 67' which, as in the case of the digitizers 67, converts the external signal to the level next greater in magnitude than the external signal. This level is sampled and held by the master sample and hold circuit 71 and copied by the slave sample and hold circuit 73 on the first and second phases of the input timing signal respectively.

When the synaptic strength signal is to be incremented an $INC_{ij}$ signal is generated on the first phase of timing signal 3. Switch 63 is operated by the same timing signal to apply the output of the slave sample and hold circuit 73 to the digitizer 67' so that the level of the stored signal is incremented by one and stored in the master sample and hold circuit 71, and copied into the slave sample and hold circuit 73 by the second phase of timing signal 3.

As mentioned, since the synaptic strength signals are only incremented, their values must be normalized to preclude an endless increase in their value. Thus, the normalization factor circuit 21 sends a signal on a lead 23 to the normalization circuit 145. The normalization circuit generates on a lead 144 a normalized value of the synaptic strength signal, $S_{ij}(t+1)$, which is equal to the stored value of the incremented synaptic strength signal $S_{ij}(t)$ multiplied by a normalizing factor, $NORM_j$.

As will be seen, the normalization factor $NORM_j$ is generated continuously by the divider 119 and stored in a sample and hold circuit 121 in response to timing signal 4. $NORM_j$ is used by the normalization circuit 145 to produce the new synaptic strength signal on lead 144 which is then stored in the n-ary memory in response to timing signal 5 by appropriate operation of the switches 95 and 63.

Since, $$NORM_j = K_j / \sum_{i=1}^{n} S_{ij}(t),$$

the new synaptic strength after normalization is $$S_{ij}(t+1) = K_j S_{ij}(t) / \sum_{i=1}^{n} S_{ij}(t),$$

and the sum of all inputs to neuron j is $$\sum_{i=1}^{n} S_{ij}(t+1) = \sum_{i=1}^{n} K_j S_{ij}(t) / \sum_{i=1}^{n} S_{ij}(t) = K_j,$$

which is the desired total of synaptic strengths for synaptic inputs to neuron j.

Figures 6, 7, 8:
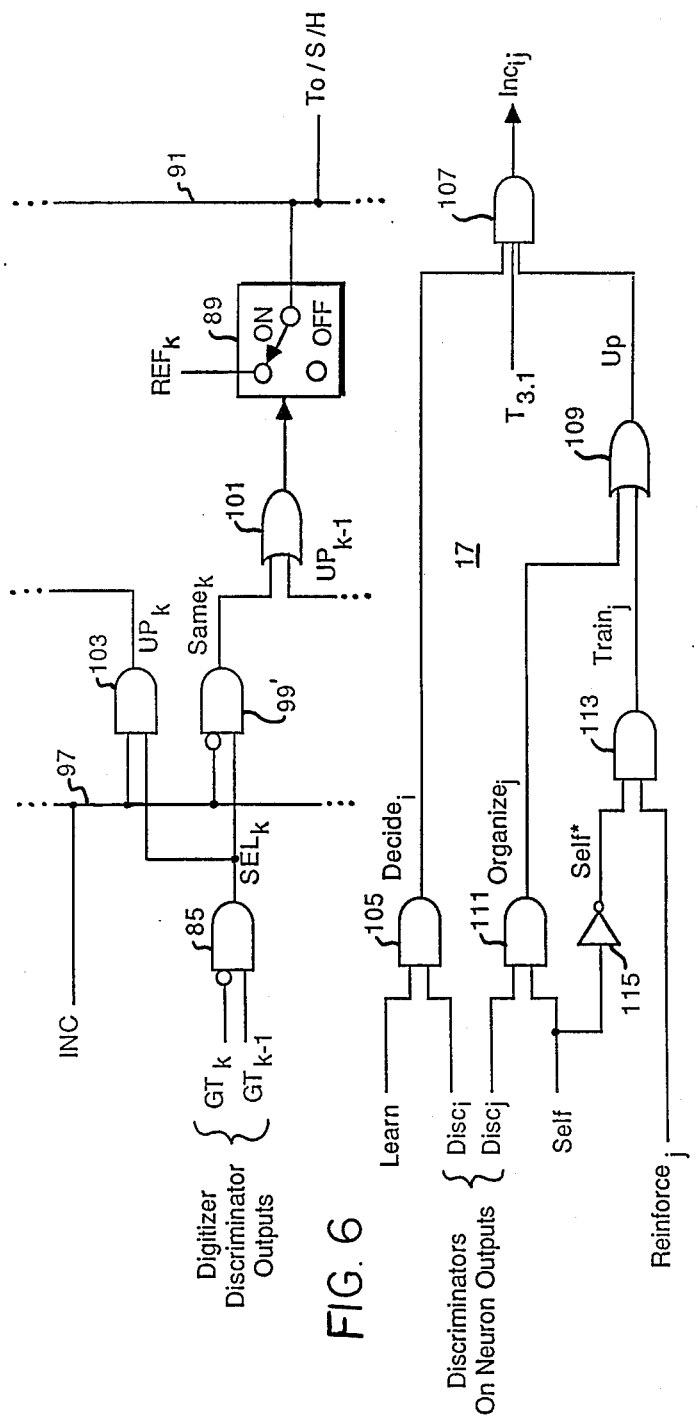
FIG. 6 is a schematic circuit of a modified portion of the n-ary digitizer illustrated in FIG. 3 adapted for the synaptic strength circuit of FIG. 5.
FIG. 7 is a schematic diagram of the logic of the increment circuit which forms a part of the neural network of FIG. 1.
FIG. 8 is a block diagram of a normalizing circuit used by the synaptic strength circuit of FIG. 5.

The modification of the tracking n-ary digitizer 57' to provide the incrementing capability is illustrated in FIG. 6. As in the case of the digitizer shown in FIG. 3, the output $GT_{k-1}$ of the discriminator associated with the highest reference signal exceeded by the applied signal and the output, $GT_k$ of the discriminator associated with the next higher reference voltage inverted, cause the output $SEL_k$ of the and GATE 85 to be TRUE. If the increment signal INC on the lead 97 is FALSE, the output $SAME_k$ of an AND gate 99 will be TRUE to operate the switch 89 through an OR gate 101 to apply the next higher reference signal $REF_k$ to the output lead 91 for storage in the sample and hold circuit. Thus, as in the digitizer of FIG. 3, if the applied signal is greater in magnitude than the reference signal REF 14, then REF15 is selected as the n-ary signal.

However, if the incrementing signal, INC, on lead 97, is TRUE, the output, $SAME_k$, of AND gate 99 is FALSE so that switch 89 is off. On the otherhand, the output, $Up_k$ of AND gate 103 will be TRUE to operate a switch 89 through an OR gate 101 to connect the reference signa $REF_k+1$ to the output lead 91. Thus, the reference signal which is second greater in magnitude than the applied signal will be connected to output lead 91 by the n-ary digitizer 57'. In the example given above, the level signal generated in the presence of an incrementing signal will be REF16.

FIG. 7 illustrates exemplary logic for the incrementing circuit 17. Such a circuit is provided for each variable synaptic strength circuit. As mentioned previously, the synaptic strength signals provide the ability for the neural network to learn. Through successive modification of the response of the network to applied inputs, the network learns a task. If the modification is controlled externally, for instance, by an operator who or a computer which observes the response of the output neurons to a certain input, and then modifies the synpatic strengths to each neuron individually the network is said to be operating in a training mode. If modification is automatically generated within the network, it is said to be operating in a self organizing mode. Such operation of a neural network is not new, however FIG. 7 illustrates an example of a circuit suitable for implementing such learning in a state analog system.

If the system is to be operated in a learning mode, the processor 43 applies a LEARN signal to AND gate 105. A synaptic strength signal will only be increased for those synapses which are receiving signals, $DISC_i$, from neurons and from external sources, which are generating an output signal above a DISC threshold so that the output of AND gate 105, $DECIDE_i$ is TRUE to enable AND gate 107. The incrementing signal, $INC_{ij}$, can only be asserted during state 3, as indicated by the timing signal $T_{3.1}$ applied to AND gate 107, and then only if UP is TRUE as well as $DECIDE_i$. UP is TRUE under one of two conditions. If SELF is TRUE, indicating the network is in the self-modification mode, an increment is desired if both the input neuron or transducer signal i, and the output neuron j, for the synapses ij are active (i.e., $DISC_i$ and $DISC_j$ are both TRUE). This makes an $ORGANIZE_j$ signal generated by an AND gate 111 TRUE, and generates an $INC_j$ signal in state 3 through an OR gate 109. If SELF is FALSE, the network is in the training mode, and an AND gate 113 which generates a $TRAIN_j$ signal is enabled by a SELF* signal generated by an inverter 115. In this train mode, an external signal, $REINFORCE_j$, is used to increment the synaptic strength signal when the source of $REINFORCE_j$ determines that the synaptic strength should be incremented. There are many different types of synaptic modification rules; this is just one possibility. The LEARN, SELF, and $REINFORCE_j$ signals are all provided through the processor 43.

FIG. 8 illustrates an exemplary embodiment of a circuit for computing the normalization factor, $NORM_j$ used by the normalization factor circuit 21. As explained above, in state 3 a modified refresh is used to increment appropriate synaptic strengths. In state 4, the normalization weighting factor, $NORM_j$, is calculated from the adjusted synaptic strengths associated with all of the synapses which supply an input to each neuron j. As shown in FIG. 8, the synaptic strengths $S_{lj}$ to $S_{nj}$ are summed in an analog adder 117. The normalizing factor is calculated in an analog divider circuit 119 by dividing the desired sum $K_j$ by the sum from adder 117. The output of normalizer 119 is stored in a simple sample and hold circuit 121 during state 4 as determined by timing signal $T_4$. The normalization factor, $NORM_j$, is stored in a simple sample and hold circuit since it is always used in the next state, 5, and therefore, does not have to be retained for long periods of time.

Figure 9:
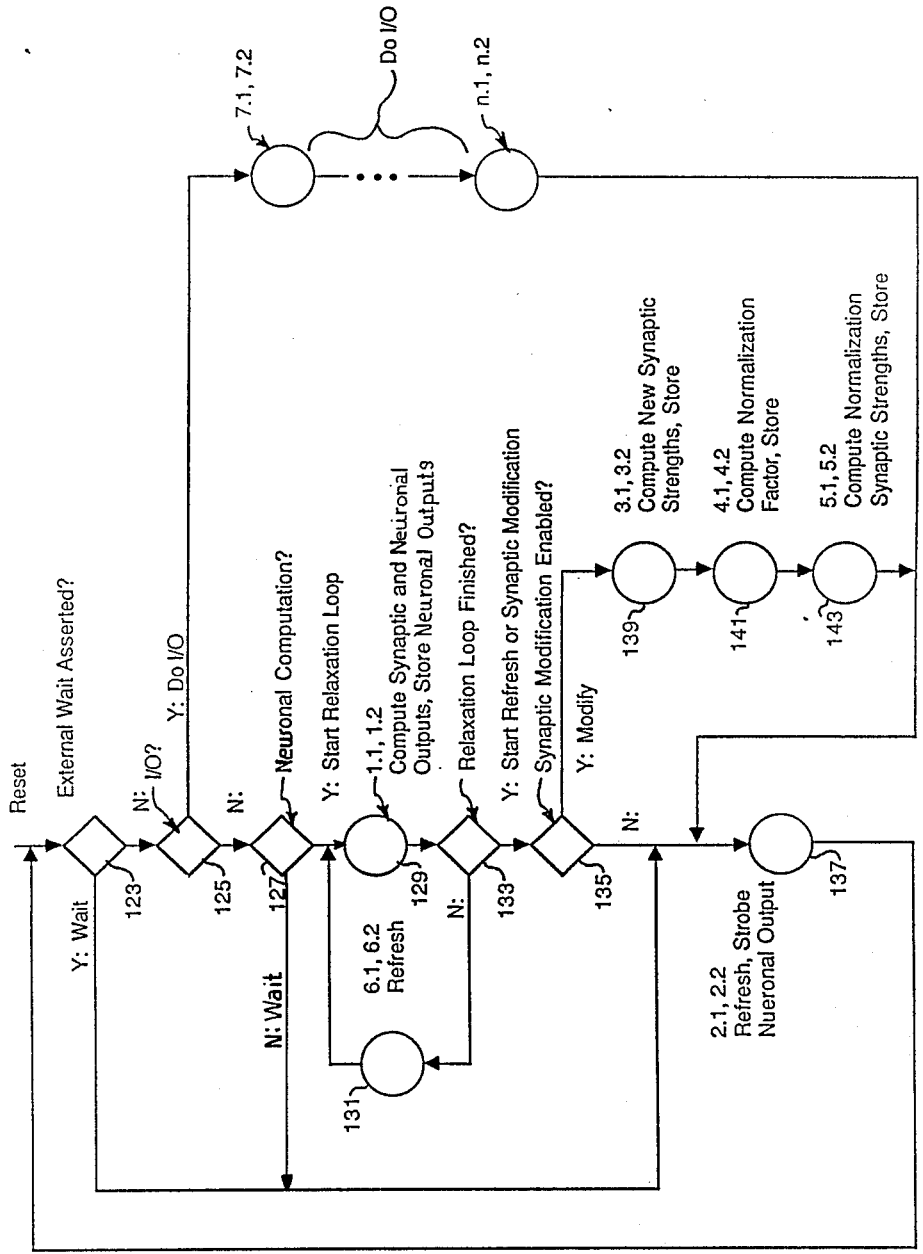

FIG. 9 is a flow diagram of the program implemented by the processor 43 to control the operation of the exemplary neural network 1. Upon reset, the program checks to see if an external wait is asserted 123. If not, and there is no call for input or output 125, but a neuronal computation is requested 127, a relaxation loop is commenced through generation of the two phase timing pulse 1 by the state logic controller 49. In response to the first timing signal, the outputs of the neuron analog circuits are stored as indicated at 129. The neuron and synapse outputs are generated using the input values stored from the previous computation. This procedure is repeated, each time using the stored values from the previous computation, until the stored values converge between successive iterations. Between iterations the stored signals are refreshed by generation of timing pulse 6 as indicated at 131. This is done primarily to refresh the synaptic strength signals which are not used in the relaxation loop. The number of iterations of the relaxation loop can be determined in different ways. For instance, a fixed or programmed number of loops can be carried out, or the calculations can be repeated until the difference in the values stored on successive loops is reduced to a selected value. During the relaxation loop, the inputs from external sources such as the transducers remains fixed. Also, the synaptic strengths remain constant.

When the relaxation loop has been completed, 133, a check is made at 135 of the need for synaptic strength modification as would be indicated by the LEARN signal being TRUE. If synaptic strength modification is not enabled, the n-ary memories are refreshed by generation of timing pulse 2 at 137. This timing pulse also strobes the input/output control 37 to output the signals generated by the output neurons. The timing pulse 2 is also generated if an external wait was asserted at 123, or if the neuronal computation was not called for at 127.

With the synaptic modification enabled at 135, timing pulse 3 is generated to implement computation and storage of new synaptic strengths at 139 through incrementing the stored value of synaptic strength signals in those circuits of FIG. 5 in which an increment signal is generated in a circuit such as shown in FIG. 7. A timing pulse 4 is then generated to store the computed normalization factor for the inputs to each neuron as indicated at 141. The timing pulse 5 is generated next to compute and store a normalized synaptic strength as indicated at 143. Upon completion of synaptic strength modification, timing pulse 2 is generated to refresh all of the n-ary memories and strobe the neuronal output. The program then loops back to the beginning, and another relaxation loop can be run using the modified synaptic strength signals.

If an input or output is called for at 125, the appropriate timing pulses 7 through n are generated to effect the appropriate input/output functions, such as reading external input of synaptic strengths and generating external output of the synaptic strength signals. Again, upon completion of the input/output routine, a timing pulse 2 is generated to refresh the n-ary memories.

It can be seen from the above that with the state analog neural network, synapse and neuron signals are generated in relaxation loops based on stabilized values of inputs stored from the previous computation. Furthermore, during these relaxation loops the synaptic strength signals are held constant. When the relaxation loop is completed, the synaptic strength signals are modified, if in a learning mode, using the stabilized values of the neuron signals. It can be appreciated then that the state analog neural network combines the massive parallel computation power and economy of real estate of analog circuits while at the same time realizing the stabilizing effect of a state machine.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A neural network comprising;
 a plurality of neuron circuits each including an analog circuit for computing an analog neuron output signal from applied input signals, and neuron memory means for storing the value of said analog neuron output signal;
 a plurality of synapse circuits each including an analog circuit for computing an analog synapse output signal from an applied input signal, and an analog synaptic strength signal which, for at least some of the synapse circuits, is variable;
 synaptic strength circuits, including for variable synaptic strengths, synaptic strength memory means storing the variable analog synaptic strength signals for selected synapses, and means for modifying said stored variable analog synaptic strength signals;
 means interconnecting said neuron and synapse circuits in a selected array of parallel paths, with said analog neuron output signals applied as input signals to selected synapse circuits, and the analog synapse signals applied as input signals to selected neuron circuits, and applying said variable analog synaptic strength signals as applied inputs to selected synapse circuits; and
 control means generating clock pulses;
 said neuron memory means and said synaptic strength memory means comprising state analog memory devices storing applied analog signals as stored analog signals only in response to selected clock pulses while making the stored analog signals continuously available, each said state analog memory device including an analog storage element having master and slave sample and hold circuits connected in series with the master sample and hold circuit connected to receive the applied signal, and with the slave sample and hold circuit continuously generating an output voltage representative of the stored analog signal, and wherein said master sample and hold circuit is responsive to a first clock pulse in a pair of clock pulses to sample and store said applied signal and said slave sample and hold circuit is responsive to a second clock pulse in said pair of clock pulses subsequent in time to said first clock pulse to sample and store the signal stored in said master sample and hold circuit as the stored analog signal such that said analog circuits repetitively generate said analog neuron output signals, synapse output signals, and synaptic strength signals in successive separate states determined by said pairs of clock pulses using stabilized analog values stored in said slave sample and hold circuits of said state analog memory devices during the previous state determined by the previous pair of clock pulses.

2. A neural network comprising:
 a plurality of neuron circuits each including an analog circuit for computing an analog neuron output signal from applied input signals, and a memory means for storing the value of said analog output signal;
 a plurality of synapse circuits each including an analog circuit for computing an analog synapse output signal from an applied input signal, and a synaptic strength signal which, for at least some of the synapse circuits, is variable;
 synaptic strength circuits, including for variable synaptic strengths, synaptic strength memory means storing the variable analog synaptic strength signals for selected synapses, and means for modifying said stored variable analog synaptic strength signals;
 means interconnecting said neuron and synapse circuits in a selected array of parallel paths, with said analog neuron output signals applied as input signals to selected synapse circuits, and the analog synapse signals applied as input signals to selected neuron circuits, and applying said variable analog synaptic strength signals as applied inputs to selected synapse circuits;
 control means generating clock pulses;
 said memory means comprising state analog memory devices storing applied analog signals only in response to selected clock pulses while making the stored analog signals continuously available, such that said analog circuits repetitively generate said analog neuron output signals, synapse output signals, and synaptic strength signals in successive separate states determined by said clock pulses using stabilized analog values stored in said state analog memory devices during the previous state;
 said state analog memory devices each comprising:
 a tracking n-ary digitizer which converts an applied signal into an n-ary signal having one of n discrete levels, with said one level being the level next greater in magnitude than the level of the applied signal;
 an analog storage element which selectively in response to clock pulses stores as a stored analog approximation signal, the n-ary signal generated by said tracking n-ary digitizer, said stored analog approximation signal drooping with time;
 switching means which selectively in response to a clock pulse applies an input signal to said tracking n-ary digitizer as said applied signal, and otherwise applies said stored analog signal stored in said analog storage element to said tracking n-ary digitizer as said applied signal;
 said control means generating clock pulses periodically at intervals which are shorter in duration than the time required for the stored analog approximation signal in said analog storage element to droop to the value of the level next smaller in magnitude than the one level, whereby the stored analog approximation signal is periodically refreshed to said one level.

3. The neural network of claim 2 wherein said analog storage element comprises master and slave sample and hold circuits connected in series with the master sample and hold circuit connected to receive the n-ary signal generated by said tracking n-ary digitizer, and with the slave sample and hold circuit continuously generating an output voltage representative of the stored analog approximation signal, and wherein said master sample and hold circuit is responsive to a first clock pulse to sample and store said n-ary signal generated by said tracking n-ary digitizer and said slave sample and hold circuit being responsive to a second clock pulse to sample and store the signal stored in said master sample and hold circuit.

4. A neural network comprising:
a plurality of neuron circuits each including an analog circuit for computing an analog neuron output signal from applied input signals, and a memory means for storing the value of said analog output signals;
a plurality of synapse circuits each including an analog circuit for computing an analog synapse output signal from an applied input signal, and an analog synaptic strength signal which, for at least some of the synapse circuits, is variable;
synaptic strength circuits, including for variable synaptic strengths, synaptic strength memory means storing the variable analog synaptic strength signals for selected synapses, and means for modifying said stored variable analog synaptic strength signals;
means interconnecting said neuron and synapse circuits in a selected array of parallel paths, with said analog neuron output signals applied as input signals to selected synapse circuits, and the analog synapse signals applied as input signals to selected neuron circuits, and applying said variable analog synaptic strength signals as applied inputs to selected synapse circuits;
control means generating clock pulses;
said memory means comprising state analog memory devices storing applied analog signals only in response to selected clock pulses while making the stored analog signals continuously available, such that said analog circuit repetitively generate said analog neuron output signals, synapse output signals, and synaptic strength output signals in successive separate states determined by said clock pulses using stabilized analog values stored in said state analog memory devices during the previous state, said means for modification of said stored analog synaptic strength signal including logic means responsive to the input signal connected to the associated synapse circuit and the output signal of the neuron circuit to which said associated synapse circuit is connected and to a clock pulse generated by the control means subsequent to a pulse which stores the latest computed value of the associated neuron output signal selectively modifying the value of the stored synaptic strength signal; wherein
the logic means includes means selectively increasing the stored value of said analog synaptic strength signals and wherein said modification means further includes analog normalizing means including means to sum all of the synapse output signals applied to the associated neuron, means generating from said sum an analog normalizing factor, means storing said analog normalizing factor in response to a clock pulse subsequent to the clock pulse to which the logic means is responsive, analog means multiplying the stored analog synaptic strength signal by said stored analog normalization factor to generate a normalized analog synaptic strength signal, and means responsive to a clock pulse subsequent to the pulse to which the means storing said analog normalizing factor is responsive, storing said normalized analog synaptic strength signal as a new value of said stored analog synaptic strength signal to be used in the next computations of the associated synaptic output signal.

5. The neural network of claim 4 wherein said memory means in said synaptic strength circuits comprise:
a tracking n-ary digitizer converting an applied signal into an n-ary signal having one of n discrete levels, with said one level being the level next greater in magnitude than the level of the applied signal;
an analog storage element selectively in response to a clock pulse, storing as the analog synaptic strength signal, the n-ary signal generated by said tracking n-ary digitizer, said stored analog synaptic strength signal drooping with time;
switching means applying said stored analog synaptic strength signal stored in the analog storage element to said tracking n-ary digitizer as said applied signal, and selectively in response to a clock pulse applying an input signal to said tracking n-ary digitizer as the applied signal; and
said control means selectively generating pulses to operate said switching means to apply said input signal to the n-ary digitizer and operate the analog storage element to store the n-ary signal generated by the tracking n-ary digitizer, and generating periodically at intervals which are shorter in duration than the time required for the stored analog synaptic strength signal in said analog storage element to droop to the value of the level next smaller in magnitude than said one level, pulses operating the analog storage element to refresh the stored synaptic strength signal, and wherein said logic means includes means for adjusting the n-ary level of the n-ary signal generated by said tracking n-ary digitizer from the applied signal.

6. The neural network of claim 5 wherein said adjusting means of the logic means includes means for incrementing the n-ary level of the n-ary signal generated by the tracking n-ary digitizer from the applied signal, wherein said means for modifying the stored analog synaptic strength signal includes an analog normalizing circuit responsive to the values of all the analog signals applied to the associated neuron circuit generating a normalized analog synaptic strength signal, and wherein said switching means is responsive to a clock pulse subsequent to the clock pulse storing the incremented analog synaptic strength signal to apply the normalized synaptic strength signal to the n-ary digitizer, and wherein said control means generates an additional clock pulse to store the n-ary signal generated from the normalized synaptic strength signal in said analog memory element.

7. The neural network of claim 5 wherein the switching means includes means for selecting an externally selected analog synaptic strength signal which is converted to an n-ary signal by said tracking n-ary digitizer and stored in the storage element.

8. A method of implementing a neural network comprising the steps of:

(a) continuously computing a plurality of analog neuron signals in a plurality of analog neuron circuits from applied analog synapse signals;

(b) continuously computing an analog synapse signal in each of a plurality of analog synapse circuits from one of a selected input signal and an applied analog neuron signal;

(c) generating a series of clock pulses;

(d) repetitively storing the analog values of the neuron signals on selected clock pulses and using the stored values as said applied analog neuron signals while maintaining the input signals constant such that the analog neuron and synapse signals are repetitively computed in successive analog states determined by said clock pulses from the last stored value of the applied signal until the computed values of the analog neuron and synapse signals converge on substantially stable values between successive analog state;

(e) outputting the stored neuron signals from selected analog neuron circuits; and (f) storing a plurality of variable analog synaptic strength signals, computing selected ones of said synapse signals from a selected one of said input signal and an applied analog neuron signal multiplied by an associated one of said stored variable analog synaptic strength signals, and during a state after the state in which said neuron and synapse signals have substantially converged to stable values modifying the stored values of selected ones of said variable analog synaptic strength signals and repeating the (a) through (e) steps using the modified stored values of the variable analog synaptic strength signals;

said analog neuron and analog variable synaptic strength signals each being stored by converting the analog signal to an n-ary signal having one of n discrete levels with said one level being the level next greater in magnitude than the associated analog signal, and sampling and holding the n-ary signal in series connected master and slave sample and hold circuits on successive clock pulses with the slave sample and hold circuit continuously providing the stored signal.

9. The method of claim 8 wherein selected ones of said stored variable synaptic strengths signals are modified as a function of the values of the outputted analog neuron signals,.

10. The method of claim 8, wherein selected of said stored variable synaptic strength signals are modified as a function of the values of the analog neuron signals generated by the analog neuron circuits to which the associated synapse signal is applied and the analog signal applied to the associated analog synapse circuit.

11. The method of claim 8 including, when the value of a stored analog signal has not been changed or modified for an interval approaching in duration the time for the stored signal to droop to the next lower n-ary level, refreshing the stored analog signal by converting the signal stored in the slave sample and hold circuit to a refreshed n-ary signal of said one level and on selected successive clock pulses, sampling and holding the refreshed n-ary signal in said master and slave sample and hold circuits.

12. The method of claim 11 wherein an analog synaptic strength signals is modified by converting the signal stored in the slave sample and hold circuit to an adjusted n-ary level different than said one n-ary level and storing the adjusted n-ary level signal in said series master and slave sample and hold circuits on successive selected clock pulses.

13. The method of claim 8 wherein the n-ary level to which a stored analog synaptic strength signal is converted is adjusted by incrementing the n-ary level to the n-ary level of second greater magnitude than the magnitude of the analog synaptic strength signal, storing the incremented synaptic strength signal in the master and slave sample and hold circuits on successive clock pulses, normalizing the incremented synaptic strength signal, converting the normalized synaptic strength signal to an n-ary signal having an n-ary level next greater in magnitude than that of the normalized synaptic strength signal and storing the normalized n-ary signal in the master and slave sample and hold circuits on selected successive clock pulses as said modified synaptic strength signal.

14. The method of claim 13 wherein said incremented n-ary signal is normalized by generating in an analog circuit a normalization factor computed from the stored values of all of the synaptic strength signals applied to the neuron to which is applied the synapse signal with which the synaptic strength signal is associated, storing the normalization factor and multiplying the stored incremented n-ary signal by said stored normalization factor.

15. The method of claim 14 wherein said normalization factor is computed by summing all of said synapse signals applied to the neuron to which the associated synapse signal is applied and dividing a desired sum by such sum.

* * * * *